June 15, 1937.　　　D. F. McPHERSON　　　2,084,059
TOASTER
Filed July 8, 1936
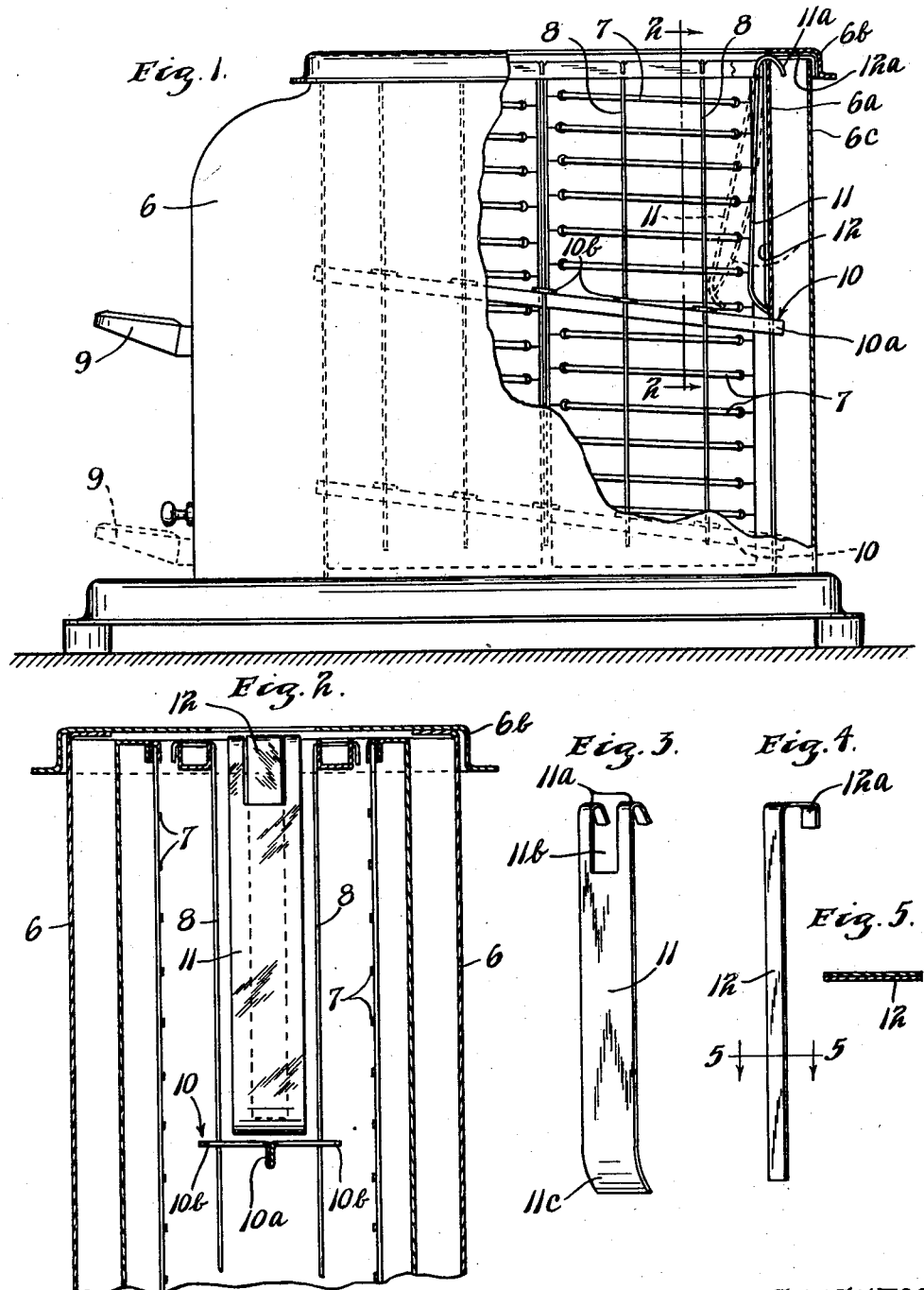
INVENTOR.
DUNCAN F. McPHERSON.
BY HIS ATTORNEYS.
Williamson & Williamson Patented June 15, 1937

2,084,059

UNITED STATES PATENT OFFICE 2,084,059

TOASTER

Duncan F. McPherson, Minneapolis, Minn.

Application July 8, 1936, Serial No. 89,513

17 Claims. (Cl. 53—5)

My invention relates to electric bread toasters and particularly to construction thereof for preventing the formation of streaks on toast caused by shadows cast by guard wires.

In the usual electric toaster structure, guard wires or rods are interposed between the bread receiving space and the heating element of the toaster to prevent contact of bread being toasted with the heating element and thus prevent charred streaks on the toast. However, such guard wires cast shadows, with respect to heat rays emanating from the heating element, on the bread being toasted and consequently bring about light colored streaks on the finished toast. Such streaks of course constitute blemishes which detract from the pleasing appearance of the toast and hence are undesirable.

A general object of my invention is to provide toaster construction wherein the formation of light colored streaks on bread toasted therein is prevented.

A more specific object is to provide toaster construction including means for producing relative movement between a slice of bread being toasted and the guard wires of the toaster during a toasting operation so that no part of the bread is shadowed by the guard wires during a very appreciable portion of a toasting operation.

Another object is to provide such a structure wherein operation of the movement producing means is automatic.

A further object is to provide such movement producing means of light, compact, simple, reliable and inexpensive construction.

These and other objects and advantages of the invention will be more fully set forth in the following description made in connection with the accompanying drawing, in which like reference characters refer to similar parts throughout the several views, and in which:—

Fig. 1 is a partially broken away, partially sectional side view of a toaster incorporating an embodiment of my invention;

Fig. 2 is a vertical sectional view taken along the line 2—2 of Fig. 1 as indicated by the arrows;

Fig. 3 is a perspective view of one part of my device;

Fig. 4 is a perspective view of another part of my device, and

Fig. 5 is a sectional view taken along the line 5—5 of Fig. 4 as indicated by the arrows.

Referring to the drawing, an embodiment of my invention is shown as incorporated in an automatic electric bread toaster of a well known type. This toaster includes an outer casing 6, spaced, parallel, vertically disposed electric heating elements 7, and vertically disposed guard wires 8 arranged in two spaced parallel planes to define an oven or bread receiving space as shown. The numeral 9 identifies the usual lever for lowering a support for a slice of bread within the bread receiving space and closing electrical contacts in the circuit of the electrical heating element. In accordance with usual practice the toaster includes mechanism operating at the termination of a predetermined time interval to raise the lever 9 and hence open the electrical contacts and raise the bread slice support.

In accordance with my invention a vertically movable bread supporting means 10, occupying an inclined rather than the customary horizontal position, is provided so that a vertically disposed slice of bread resting thereon will tend to slide down the slope thereof. In the drawing the bread support 10 is shown as sloping toward the rear of the toaster and is illustrated in its uppermost position in full lines and in its lowermost position in dotted lines. The movable bread support 10 consists of a backbone element 10a with horizontally outwardly extending apertured ears 10b formed thereon and, by means of their apertures, connected to the vertically disposed guard wires 8 for vertical sliding movement with respect thereto. The mechanism involved in raising and lowering the support 10 within the bread receiving space of the toaster is included in the toaster structure and is constructed according to well known practice.

Means is provided for action during a toasting operation to slowly propel a slice of bread being toasted in such a direction that no portion of the bread slice will be shielded or shadowed from the heating elements 7 by the guard wires 8 for a very appreciable portion of the time interval involved in the toasting of the slice. In the embodiment of my invention illustrated in the drawing the direction referred to is a substantially horizontal direction differing from a true horizontal direction only to the extent of the inclination of the bread slice support 10 relative to the horizontal.

Shiftable means is provided for engaging a bread slice resting on the bread slice support 10 for the purpose of propelling the bread slice up the slope of the support 10. To this end a shiftable bread slice propelling element 11 is provided above the lowermost end of the inclined bread slice support 10 in position to engage the rear vertical edge of a bread slice resting on the support 10. The propelling element 11 shown in Fig. 3 consists of a flat strip of relatively rigid material swingably mounted at its upper end and adapted at its lower end for abutment with a vertically extending edge of a vertically disposed slice of bread. The upper portion of the propelling element 11 is bifurcated and rearwardly and downwardly bent to form a pair of spaced parallel hooks 11a disposed at opposite sides of an upwardly opening notch 11b as shown. The hooks 11a are hooked over a suitable element such as the vertical inner rear wall 6a of the toaster casing so as to form a connection from which the propelling element 11 swingably depends for movement toward and away from a bread slice disposed within the toaster. The lower end 11c of the propelling element 11 is rearwardly curved so as to present a rounded surface to the edge of a bread slide engaged thereby.

Automatically operating actuating means for swinging the propelling element 11 forwardly during a toasting operation is provided. While other types of actuating means operated from mechanical energy available in the timing mechanism of an automatic toaster could just as well be employed for moving the propelling element 11, I have illustrated a thermostatically operated actuating means acted upon by heat emanating from the heating elements 7, during a toasting operation. The form of thermostatic actuating element illustrated in Figs. 4 and 5 consists of a flat bi-metallic thermostatic bar 12 bent rearwardly and then downwardly in its upper portion, as shown, to form a flat topped hook 12a for use in rigidly mounting the upper end of the bar 12 with the remainder of the bar 12 depending in a generally vertical position. The upper end of the bar 12 is disposed between the hooks 11a of the propelling element 11 and the rearward portion of the hook 12a is rigidly mounted as by clamping the same between the cover 6b and rear wall 6c of the toaster casing 6 as shown. The thermostatic bar 12 is disposed rearwardly of the propelling element 11 and at its lower end engages the rear side of the rearwardly curved lower end 11c of the propelling element 11. The thermostatic bar 12 is so arranged as to flex forwardly when its temperature is raised and rearwardly when its temperature is lowered.

In operation of the toaster illustrated and described a slice of bread to be toasted is placed in the bread receiving space of the toaster resting on edge on the bread support 10 and pushed toward the rear to abut the propelling element 11. When the thermostat bar 12 is cold, it and the propelling element 11 will be in the positions thereof shown in full lines in Fig. 1. The lever 9 is pushed down to close electrical contacts in the circuit of the heating elements 7 and to lower the bread slice support 10 to the position thereof shown in dotted lines in Fig. 1. As heat from the heating elements 7 is applied to the bread slice to toast the same, heat also reaches the thermostatic bar 12 to gradually increase the temperature thereof and hence cause the same to gradually flex forwardly. Forward flexing of the thermostatic bar 12 swings the propelling element 11 forwardly to slowly push the bread slice up the slope of the inclined bread slice support 10. Such slow continuous movement of the bread slice relative to the guard wires 8 during toasting insures that no portion of the bread slice is shielded from the heating elements 7 by the guard wires 8 for a very appreciable portion of the time interval required for the toasting operation. The result is that the slice of bread is uniformly toasted and no light colored streaks thereon are caused by the shielding effect of the guard wires 8. When the current to the electric heating elements 7 is shut off at the termination of a toasting operation the thermostatic bar 12 will tend to cool off and move toward its initial position shown in full lines in Fig. 1 so as to permit movement of the propelling element 11 to its initial position shown in full lines in Fig. 1.

While an embodiment of my invention has been illustrated and described as applied to one particular type of bread toaster, it should be obvious that embodiments of my invention are well adapted for use in other types of bread toasters, both automatic and non-automatic, in appliances for applying heat to objects and materials other than bread, and in heating appliances wherein heat sources other than electric heating elements are employed.

It is apparent that I have invented novel, simple, effective and inexpensive automatic means for incorporation in bread toasters to prevent formation of guard wire streaks on toast made in such toasters.

It will, of course, be understood that various changes may be made in the form, details, proportions and arrangement of parts, without departing from the scope of my invention, which, generally stated, consists in a device capable of carrying out the objects above set forth, and in the novel parts and combinations of parts disclosed and defined in the appended claims.

What is claimed is:—

1. A toaster comprising a heating element for toasting food products, a guard element protecting the product being toasted from direct contact with the heating element and thermostatic means operated by the heat of the heating element and moving the product relative to the guard element during the toasting operation to prevent a guard element shadow mark from appearing on the toasted product.

2. The structure defined in claim 1, said thermostatic means being supported to engage the product while said product is being toasted.

3. A toaster comprising an oven within which food products may be toasted, a heating element for heating the oven, guard elements protecting the food product from actual contact with the heating element, a vertically operating carrier acting in conjunction with the guard elements to support the product within the oven and means producing relative shifting movement between the product and the guard elements in the carrier during the toasting operation.

4. A toaster comprising a heating element for toasting food products, means for supporting a food product adjacent said heating element, a guard element protecting said food product against actual contact with said heating element, and thermostatic means operated by the heat of said heating element and moving said product along said supporting means relative to said guard element during the toasting operation, to prevent a guard element shadow mark from appearing on the toasted product.

5. A toaster comprising a heating element disposed in substantially a vertical plane for toasting food products disposed in substantially a vertical plane, means for supporting a food product in substantially a vertical plane adjacent said heating element, a generally vertically extending guard element protecting said food product against actual contact with said heating element, and thermostatic means operated by the heat of said heating element and moving said product along said supporting means relative to said guard element during the toasting operation to prevent a guard element shadow mark from appearing on the toasted product.

6. A toaster comprising a heating element disposed in substantially a vertical plane for toasting food products disposed in substantially a vertical plane, supporting means for resting thereupon of a vertically disposed food product adjacent said heating element, a generally vertically extending guard element protecting said food product against actual contact with said heating element, and thermostatic means operated by the heat of said heating element and moving said product along said supporting means relative to said guard element during the toasting operation to prevent a guard element shadow mark from appearing on the toasted product.

7. A toaster comprising a heating element disposed in substantially a vertical plane, supporting means for resting thereupon of a vertically disposed food product adjacent said heating element, said supporting means being inclined in a direction parallel to the plane of said heating element, a generally vertically extending guard element protecting said food product against actual contact with said heating element, and thermostatic means operated by the heat of said heating element and moving said product up the slope of said inclined supporting means during the toasting operation to prevent a guard element shadow mark from appearing on the toasted product.

8. A toaster comprising a heating element disposed in substantially a vertical plane, supporting means for resting thereupon of a vertically disposed food product, adjacent said heating element, a generally vertically extending guard element protecting said food product against actual contact with said heating element, and thermostatic means positioned to bear against a vertical edge of said food product and, responsive to heat from said heating element, to propel said food product along said supporting means during the toasting operation to prevent a guard element shadow mark from appearing on the toasted product.

9. A toaster comprising a heating element disposed in substantially a vertical plane, supporting means for resting thereupon of a vertically disposed food product adjacent said heating element, said supporting means being vertically movable within limits, a generally vertically extending guard element protecting said food product against actual contact with said heating element, and thermostatic means located above the upper limit of movement of said supporting means and positioned to bear against a vertical edge of said food product and, responsive to heat from said heating element, to propel said food product along said supporting means during the toasting operation to prevent a guard element shadow mark from appearing on the toasted product.

10. A toaster comprising a heating element disposed in substantially a vertical plane, supporting means for resting thereupon of a vertically disposed food product adjacent said heating element, said supporting means being inclined in a direction parallel to the plane of said heating element and being vertically movable within limits, a generally vertically extending guard element protecting said food product against actual contact with said heating element, and thermostatic means located above the lowest end of said supporting means when the same is at its upper limit of movement and positioned to bear against a vertical edge of said food product and, responsive to heat from said heating element, to propel said food product along said supporting means during the toasting operation to prevent a guard element shadow mark from appearing on the toasted product.

11. In an electric bread toaster having a vertically disposed bread slice receiving space, a heating element for delivering heat to said space, at least one vertically disposed guard element interposed between said heating element and said space, and a platform for supporting a bread slice in said space, an element disposed above an end of said platform and swingable toward a bread slice disposed in said space, and a thermostatic element arranged to displace said swingable element toward said slice responsive to heat received by said thermostatic element from said heating element whereby said slice will be moved along said platform during toasting of said slice to prevent a guard element shadow mark from appearing on the toasted product.

12. In an electric bread toaster having a vertically disposed bread slice receiving space, a heating element for delivering heat to said space, and at least one vertically disposed guard element interposed between said heating element and said space, an inclined platform for supporting a bread slice in said space, an element disposed above the lower end of said platform and swingable toward a bread slice disposed in said space, and a thermostatic element arranged to displace said swingable element toward said slice responsive to heat received by said thermostatic element from said heating element whereby said slice will be moved up the slope of said platform during toasting of said slice to prevent a guard element shadow mark from appearing on the toasted product.

13. A toaster comprising an oven within which food products may be toasted, a heating element for heating the oven, a food product carrier mounted for movement in substantially a vertical plane and having an inclined bottom to cause the food product carried thereby to slide by gravity toward one end of the oven, guard elements protecting the food product held by the carrier from actual contact with the heating element and means moving the food product relative to the guard element along said inclined bottom during the toasting operation to prevent a guard element shadow mark from appearing on the toasted product.

14. The structure defined in claim 13, said means engaging the food product when disposed in said carrier in its lowest position and acting to move the food product upwardly along the incline of the carrier as the toasting progresses.

15. A toaster comprising a heating element for toasting food products, a plurality of vertical guard elements protecting the product being toasted from direct contact with the heating element and means swinging the product slightly relative to the guard elements during the toasting operation to prevent guard element shadow marks from appearing on the toasted product.

16. A toaster comprising a heating element for toasting food products, a plurality of spaced guard elements protecting the product being toasted from direct contact with the heating element and means moving said product relative to the guard elements during the toasting operation in a direction having a component transverse to the guard elements, said means being so constructed as to move the product a distance less than the spacing between guard elements whereby no part of the product can pass any guard element more than once during the toasting of the product and shadow marks from guard elements on the product will be prevented.

17. A toaster comprising a heating element for toasting food products, a plurality of spaced parallel vertical guard elements protecting the product being toasted from direct contact with the heating elements and means moving said product transversely of the guard elements less than the spacing between adjacent guard elements during the toasting operation whereby no part of the product can pass any guard element more than once during the toasting of the product and shadow marks from guard elements on the product will be prevented.

DUNCAN F. McPHERSON.